Oct. 18, 1960        C. F. PAYNE        2,956,699
TRANSPORTATION CONTAINER

Filed Aug. 2, 1957        3 Sheets-Sheet 1

Charles F. Payne
INVENTOR.

BY
Charles E. Lightfoot
ATTORNEY

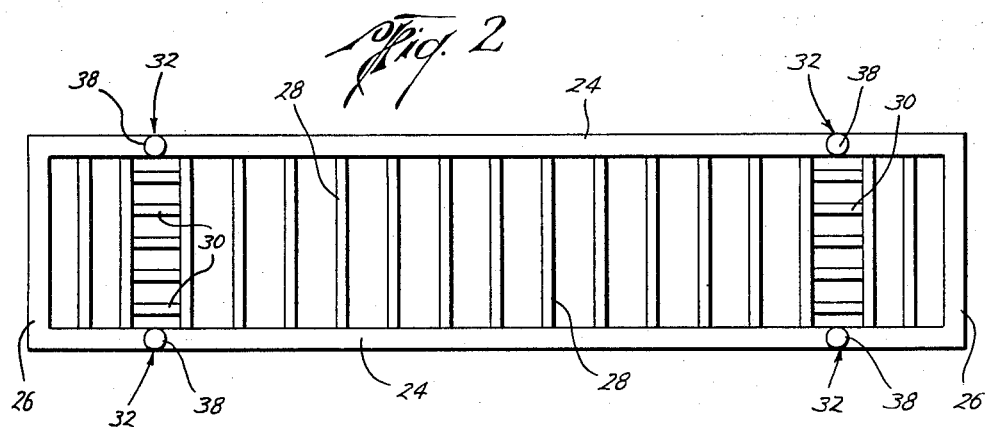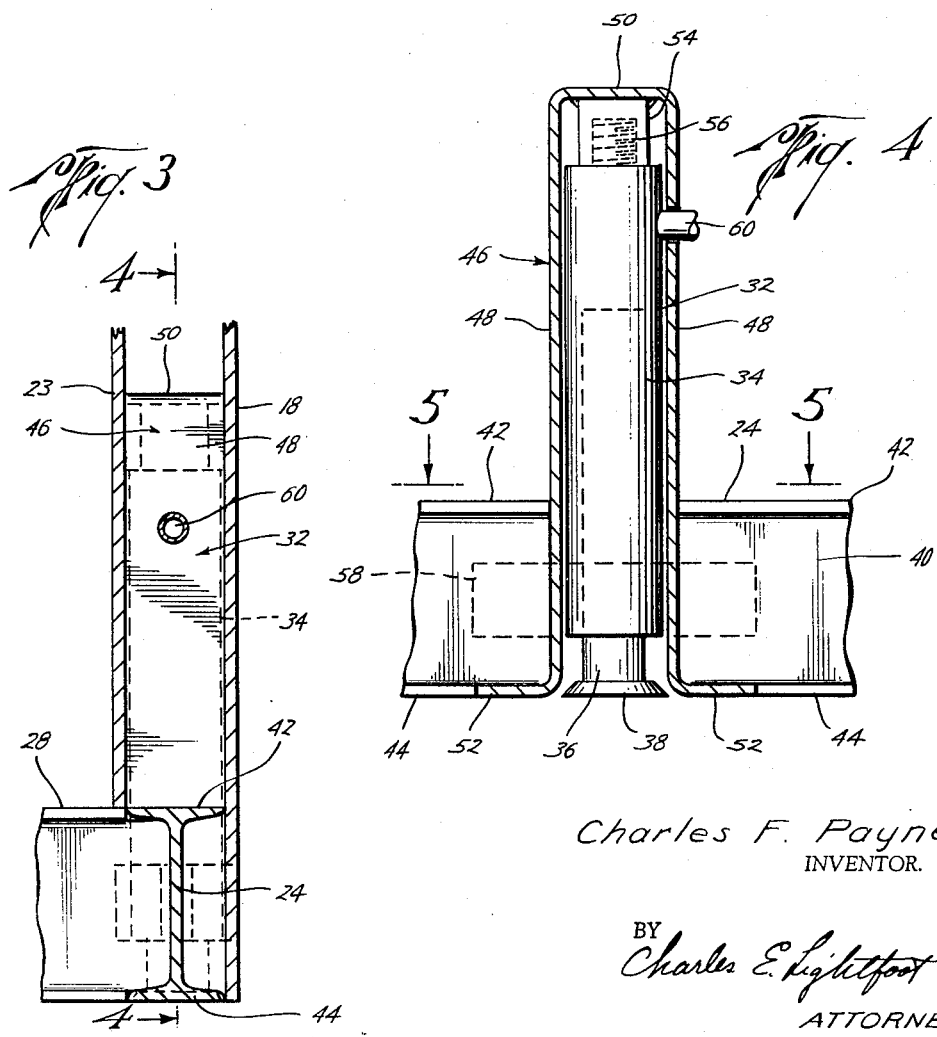

Oct. 18, 1960 — C. F. PAYNE — 2,956,699
TRANSPORTATION CONTAINER
Filed Aug. 2, 1957 — 3 Sheets-Sheet 3
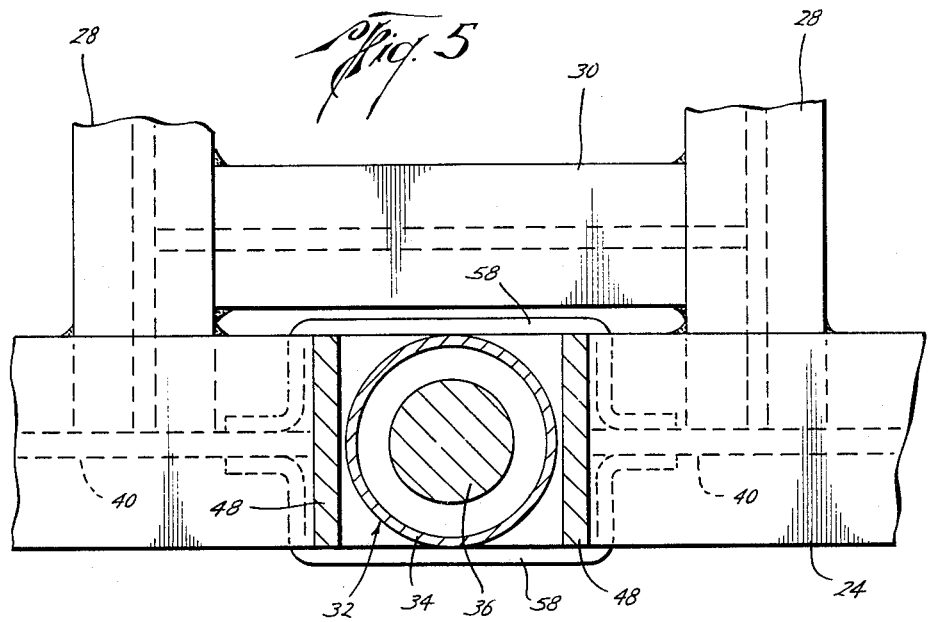
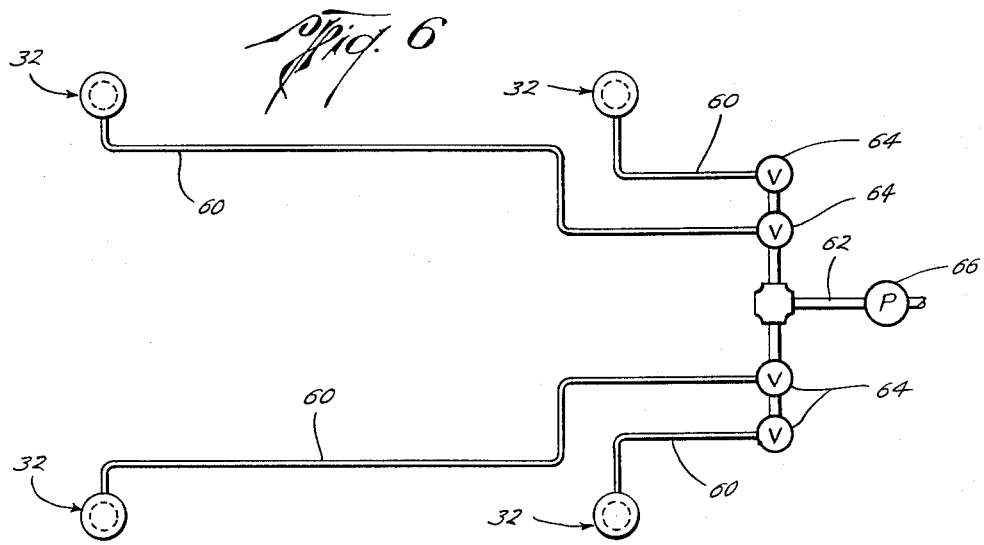
Charles F. Payne
INVENTOR.
BY Charles E. Lightfoot
ATTORNEY

United States Patent Office 2,956,699
Patented Oct. 18, 1960

2,956,699

TRANSPORTATION CONTAINER

Charles F. Payne, 1745 Crestdale, Houston, Tex.

Filed Aug. 2, 1957, Ser. No. 675,946

2 Claims. (Cl. 214—515)

This invention relates to a transportation container and more particularly to a container of the van type which is adapted to be raised and lowered for the purpose of positioning the container on a conveyor or dolly whereby the container may be readily transferred from one supporting platform to another.

The invention finds particular application in connection with transportation equipment such as vans, wagon-lits, and containers or the like, such as those of the type known as LCL or less-carload-lot containers, which are adapted to be transported on railroad flat cars and transferred from and to platforms or flat-bodied trucks.

Heretofore in the handling or trans-shipping of containers of this type it has been customary to make use of overhead cranes, fork-lift mechanism and other kinds of relatively heavy and expensive lifting equipment for lifting the containers to move them about from one vehicle to another or from platform to vehicle and vice versa. Container handling equipment of this character requires not only a large initial investment but also the employment of highly skilled operators so that its general use has been found to be costly.

The present invention has for an important object the provision of a transportation container which is adapted for use with relatively inexpensive conveyor means whereby the same may be easily moved about and transferred from vehicle to vehicle.

Another object of the invention is to provide a transportation container having means for elevating the same above a supporting surface, such as a platform, whereby a dolly or other suitable device may be inserted beneath the container to support the same for moving about.

A further object of the invention is the provision of a transportation container or van having a frame provided with spaced apart, hydraulically operated lifting devices engageable with a support upon which the container rests and which may be operated to lift the container to a position to enable a dolly or other suitable conveyor to be positioned beneath the container to support the same for moving about.

Another object of the invention is to provide a transportation container having an underframe which is constructed and shaped for the attachment thereto of removable and replaceable, hydraulically operable lifting devices and which is reinforced to enable the container to be lifted by such devices while heavily loaded.

The above and other important objects and advantages of the invention may best be understood from the following detailed description, constituting a specification of the same, when considered in conjunction with the annexed drawings, wherein—

Figure 2 is a bottom plan view of the invention as illustrated in Figure 1;

Figure 3 is a cross-sectional view on a somewhat enlarged scale, taken along the line 3—3 of Figure 2, looking in the direction indicated by the arrows;

Figure 4 is a cross-sectional view taken along the line 4—4 of Figure 3, looking in the direction indicated by the arrows;

Figure 5 is a cross-sectional view, on an enlarged scale, taken along the line 5—5 of Figure 4, looking in the direction indicated by the arrows; and Figure 6 is a plan view of the piping arrangement of the hydraulic system of the invention, on a somewhat enlarged scale, showing the same removed from the container.

Figure 1:
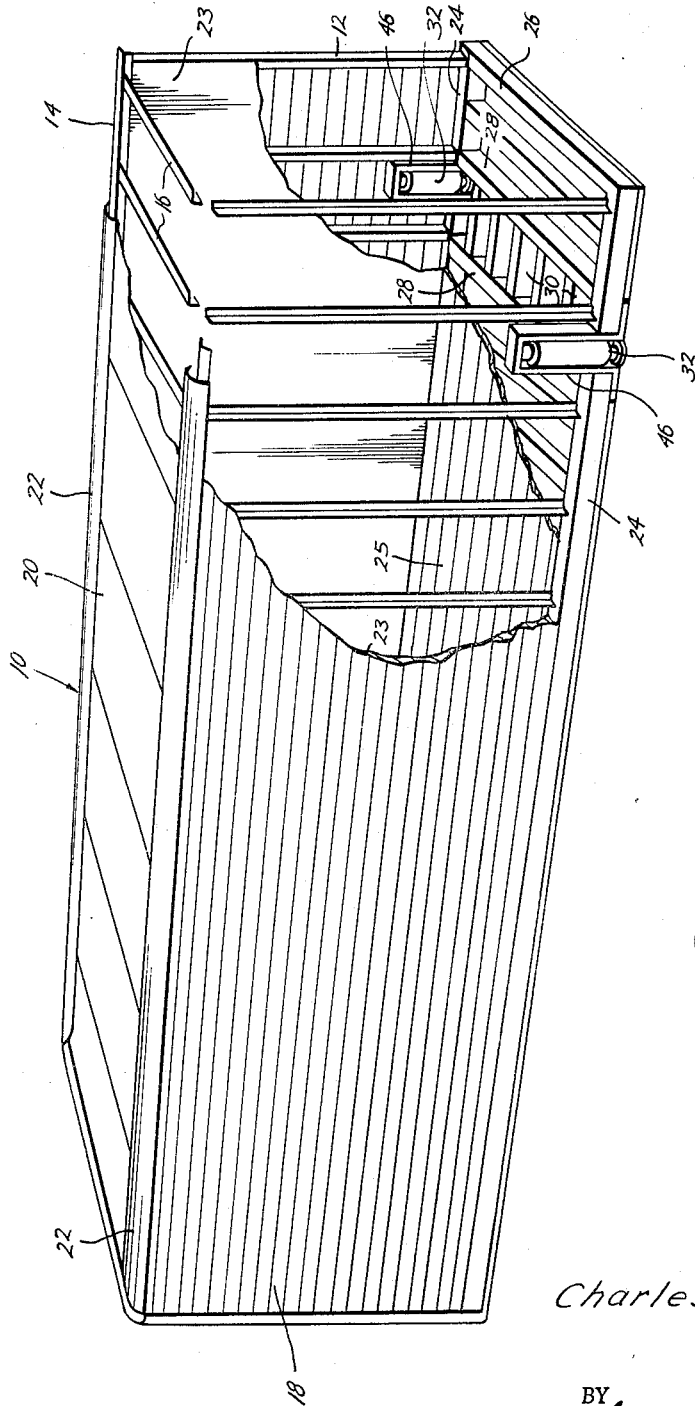
Figure 1 is a perspective view, partly broken away and partly in cross-section, of a transportation container illustrating a preferred embodiment of the invention and showing the improved frame construction and lifting means thereof.

Referring now to the drawings in greater detail the invention is illustrated herein in connection with vans or containers of the type used in the transportation of goods by ship, rail or on flat bed trucks. Containers of this type, such as the container generally indicated at 10 in Figure 1, are commonly constructed of metal, having a rectangular underframe, spaced apart, upwardly extending uprights 12 extending upwardly from the underframe, headers 14 connected to the upper ends of the uprights 12 and cross members 16 extending between and connected at their opposite ends to the headers. The superstructure above the underframe supports metallic side and end walls, such as those indicated at 18, and a metallic roof 20, the junctures of the side and end walls with the roof being suitably covered as indicated at 22, to form a weatherproof structure.

The van or container may also be provided with internal walls, such as those indicated at 23, and a floor 25 resting upon the top of the underframe.

The underframe of the van or container is constructed with suitable side and end frame members 24, 26 respectively, which may take the form of I-beams, which are connected together at their ends as by means of welding to form a rectangular frame, which is suitably braced by cross members 28, which may also take the form of I-beams welded or otherwise suitably secured at their opposite ends to the frame members.

Suitable braces 30 may also be provided between certain of the cross members 28 of the underframe, which braces may also take the form of I-beams welded at their opposite ends to the cross members.

For the purpose of raising the van or container above a platform or other supporting surface upon which it rests, hydraulic jacks, such as those generally indicated at 32, may be provided at spaced locations on the underframe, four such jacks being shown in the present illustration, attached to the side frame members 24 of the container at locations between the cross members 28 which are connected by the braces 30.

Each of the hydraulic jacks includes hydraulic cylinders 34 and a plunger 36, provided at its lower end with a foot 38 which is adapted to bear against the floor or supporting surface upon which the container rests.

The hydraulic jacks are attached to the underframe by cutting away portions of the web 40 and the upper and lower flanges 42 and 44 of the side frame member 24 and inserting in the opening thus provided the stirrup or support element 46, of inverted U-shape, having side arms 48, connected by a bottom web 50, and whose side arms are out-turned as indicated at 52 for attachment to the web 40 of the side frame member and to the lower flange 44 thereof, flush with the lower surface of the flange 44, as best seen in Figure 4 of the drawings.

The upper end of the hydraulic cylinder 34 is detachably connected to the bottom web 50 of the stirrup, as by means of a filler block 54, welded at its upper end to the bottom web 50 between the arms 48 and having an internally threaded opening 56, into which an externally threaded upper end projection from the cylinder is threadably fitted.

For the purpose of more securely retaining the cylinder 34 in place, and to hold the same against lateral movement in the stirrup 46, braces 58, of U-shape whose side arms are out-turned, are provided, welded at their opposite ends to the web 40, and extending over the side edges of the arms 48 of the stirrup, as best seen in Figure 5 of the drawings.

Each of the hydraulic cylinders 34 has an inlet pipe 60 near its upper end, for the supply of hydraulic fluid under pressure to the interior of the cylinder and the exhaust of the same therefrom.

By the above described structure and arrangement of the hydraulic jacks and the attaching means therefor, it will be apparent that the jacks may be readily removed and replaced by merely disconnecting the supply pipe 60, and unscrewing the cylinder from the block 54. Moreover, because of the side arms 48 and the braces 58 the cylinders of the jacks are held in a vertical position under all conditions and the strength of the underframe of the van is augmented by the structure of the attaching means at the locations where the force of the jacks is applied to the frame to lift the van.

The hydraulic system by which hydraulic fluid under pressure is supplied to the jacks is illustrated diagrammatically in Figure 6, wherein the supply pipes 60 leading to the jacks are connected in communication with a main supply pipe 62, each of the supply pipes 60 being under the control of a suitable valve, as indicated at 64, and the main supply pipe 62 leading to a suitable source of hydraulic fluid under pressure such as the pump 66.

In making use of the container of the invention, constructed and arranged as described above, assuming that the container is resting upon a supporting surface such as a platform, with the hydraulic jacks elevated, as illustrated in Figures 1 and 4 of the drawings, the jacks may be operated by supplying hydraulic fluid thereto through the supply pipes 60, to move the plungers 36 downwardly, to engage the feet 38 with the support and lift the container to an elevated position above their support. With the container thus elevated, suitable means, such as a wheeled dolly or conveyor may be inserted beneath the container, whereupon the container may be lowered onto such means by exhausting the hydraulic fluid from the jacks. When the container has been moved to a desired location, the jacks may again be operated to raise the container to permit the withdrawal of the dolly or conveyor, whereupon the container may be lowered by exhausting the hydraulic fluid from the jacks.

It will thus be seen that the invention, constructed and operated in the manner described above, provides a transportation container which is of simple design and rugged construction, having hydraulic mechanism by which the same may be suitably raised and lowered as desired, and in which the hydraulic jack units are easily removed and replaced for purposes of maintenance and repair.

The invention has been disclosed herein in connection with a certain specific embodiment of the same, but it will be understood that this is intended by way of illustration only, and that numerous changes can be made in the construction and arrangement of the parts within the spirit of the invention and the scope of the appended claims.

Having thus clearly shown and described the invention what is claimed as new and desired to secure by Letters Patent is—

1. In a transportation container having an under frame formed with vertically spaced upper and lower horizontally extended flanges and a vertical web connecting the flanges and having spaced apart vertical openings through said flanges and web, a support element of inverted U-shape in each opening and whose arms are positioned vertically and formed at their lower ends with outturned portions extending beneath said web in the plane of said lower flanges, a vertically disposed pressure fluid cylinder located between the arms of each element, means connected to said web and extending over the edges of the arms at each side of the element in position to cooperate with the arms to hold the cylinder against movement away from its vertical position, and a plunger movably positioned in each cylinder for movement to one position with its lower end out of force transmitting contact with a supporting surface upon which the container rests and to another position in engagement with said surface and extending below the frame to support the container over said surface.

2. In a transportation container an underframe having longitudinally extending side frame elements each formed with vertically spaced upper and lower horizontally extended flanges and a vertical web connecting the flanges, pairs of longitudinally spaced, laterally extending cross members connecting the side frame elements and longitudinally extending braces connecting the cross members of each pair, each of said side frame elements having a vertical opening through the flanges and web of the element between each pair of cross members, a support element of inverted U-shape in each opening and whose arms are positioned vertically and formed at their lower ends with outturned portions extending beneath the web of the element in the plane of the lower flanges thereof, a vertically disposed pressure fluid cylinder located between the arms of each support element, means connected to the web of each side frame element and extending over the edges of the arms at each side of each support element in position for coaction with the arms to hold the cylinder against movement away from its vertical position, and a plunger movably positioned in each cylinder for movement to one position with its lower end elevated above a supporting surface upon which the container rests and to another position in engagement with said surface to support the container above said surface.

References Cited in the file of this patent

UNITED STATES PATENTS

| | | |
|---|---|---|
| 1,303,854 | Clark | May 20, 1919 |
| 1,727,334 | Bridgens | Sept. 10, 1929 |
| 1,857,653 | Meyercord et al. | May 10, 1932 |
| 2,002,455 | Schwerin | May 21, 1935 |
| 2,278,885 | Kuhl | Apr. 7, 1942 |
| 2,365,169 | Billings | Dec. 19, 1944 |
| 2,545,403 | Wrenn | Mar. 13, 1951 |
| 2,703,659 | Hutchins | Mar. 8, 1955 |
| 2,715,971 | Cox | Aug. 23, 1955 |
| 2,724,572 | Weinberg | Nov. 22, 1955 |
| 2,751,234 | Couse | June 19, 1956 |